Oct. 6, 1959     A. CONTRERAS     2,907,449
CONVEYOR
Filed July 29, 1957     2 Sheets-Sheet 1
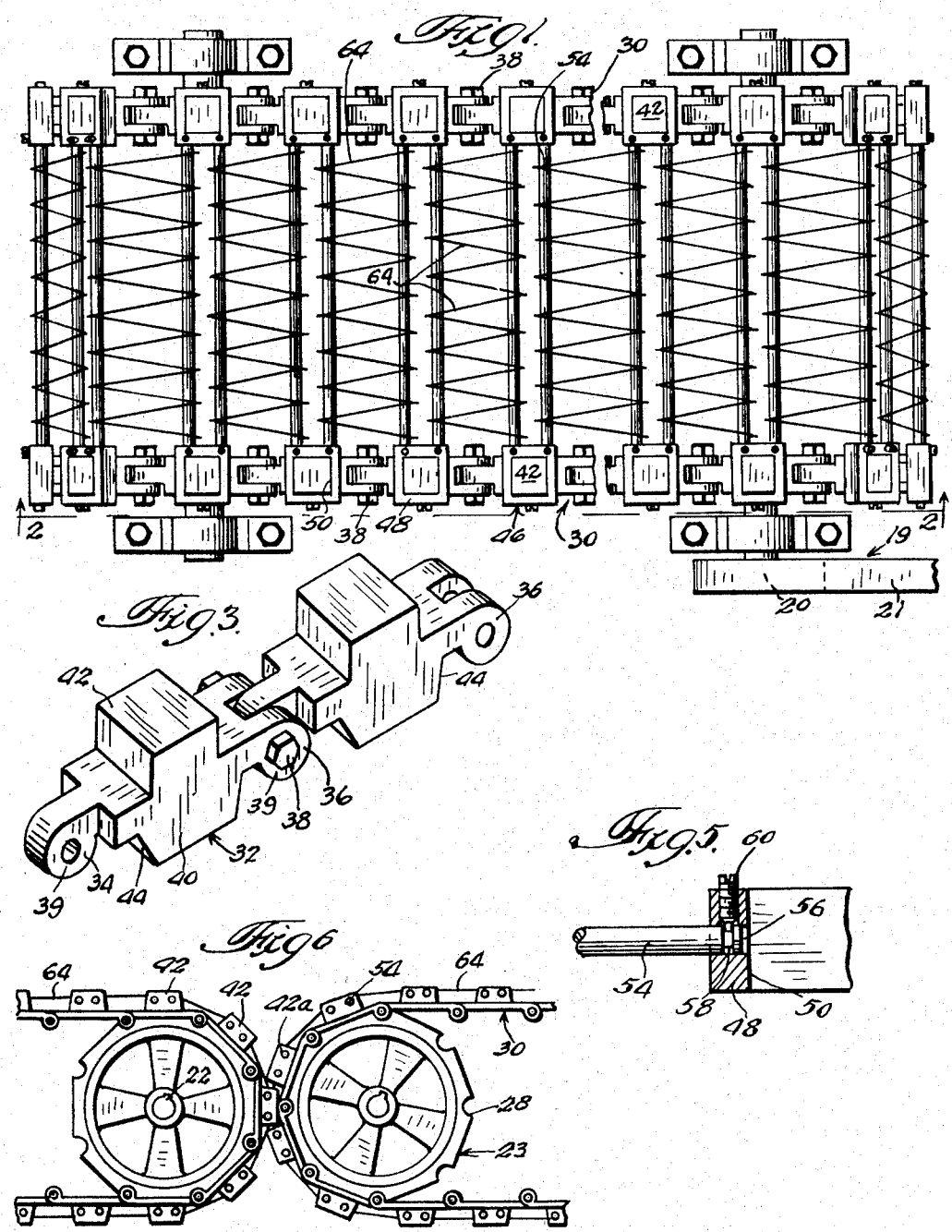
Inventor.
By: Agripin Contreras
Ralph M. Faust Atty.

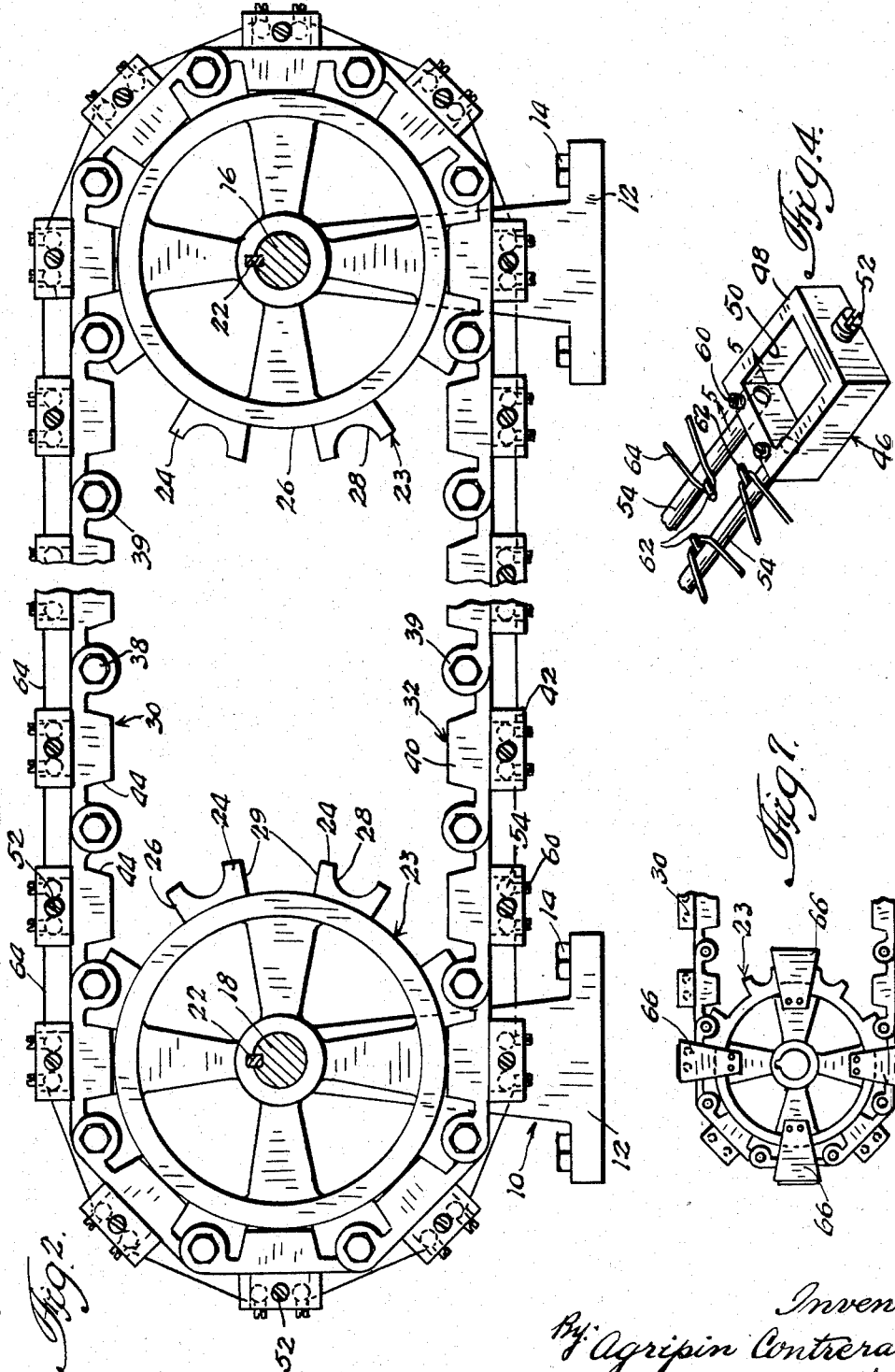

2,907,449
CONVEYOR

Agripin Contreras, Chicago, Ill.

Application July 29, 1957, Serial No. 674,953

10 Claims. (Cl. 198—195)

This invention relates to conveyors and more particularly to portable conveyor systems.

It is a primary object of the present invention to provide a conveyor system having all the portions thereof adapted for easy assembly and disassembly into small units in such a manner that the various parts for even a large conveyor may be packed into comparatively small containers for ready portability.

It is another object of the present invention to provide a conveyor system which is convertible easily and quickly from one size or type of conveyor to another.

It is a further object of the invention to provide a conveyor driven by special sprockets adapted to drive a chain which is also adapted to carry the body portion of the conveyor system.

Another object of the invention is to provide a flight type conveyor having the body surface portion releasably secured to consecutive flights for rapid replacement of the body portions in case of damage or the like.

Other objects and advantages will become apparent from the following descriptions and associated drawings wherein:

Figure 1 is a top plan view of a conveyor system incorporating the elements of the present invention;

Figure 2 is a side elevational view of the structure shown in Figure 1;

Figure 3 is a fragmentary perspective view of a portion of the conveyor chain;

Figure 4 is a fragmentary view of one of the detachable conveyor flights;

Figure 5 is a partial sectional view taken substantially along the line 5—5 of Figure 4;

Figure 6 is a fragmentary side elevational view of an alternate embodiment of the invention, and Figure 7 is a fragmentary bottom plan view of still another embodiment of the invention.

Referring to the drawings and particularly to Figures 1 and 2, it is seen that the assembled conveyor comprises a frame indicated generally at 10 which, in the preferred embodiment, comprises spaced pedestal pillow block stands 12 which preferably are bolted to the floor by means of stud bolts 14. Alternately, the frame may comprise a complete unit wherein the stands 12 are interconnected by suitable means such as angle iron frame members in which case the frame need not be secured to the floor.

Journaled in the spaced stands for rotation therein are a drive shaft 16 and a drive shaft 18 (Figure 2). The shaft 16 may be driven in any conventional manner, such as indicated generally at 19 (Figure 1), and in this instance comprises a pulley 20 which is keyed to the shaft 16 and is connected by a belt 21 to a source of power such as an electric motor (not shown). Keyed as at 22 to the respective shafts 16 and 18 are spaced chain gear sprockets indicated generally at 23 in Figure 2. Each of the sprockets 23 comprises spaced outwardly projecting teeth 24, each pair of adjacent teeth forming spaced, transverse, generally rectilinear recesses and each individual tooth 24 having formed therein a transverse generally arcuate recess or opening 28. Preferably the sides of the teeth 24 are radially disposed for a purpose to be explained hereinafter.

Carried by and connecting each pair of radially aligned sprockets is a chain indicated generally at 30 in Figures 1 and 2. Each chain comprises a plurality of separate, readily detachable, links 32 which are shown in detail in Figure 3.

Each of the links 32 comprises a tongue 34 at one end thereof and a clevis arrangement 36 at the opposite end thereof. In assembly the tongue 34 of one particular link is receivable in the clevis portion of another link and the two links are pivotally connected by releasable pin or bolt means 38. The tongue and clevis portion of each link are provided with a depending generally arcuate portion 39 receivable in the opening 28 of the sprocket to provide thereby driving means between the sprocket and the chain. Each link also comprises a depending block or boss on the radially inner portion of the chain and receivable in the spaced recesses 26 of the sprocket. If small loads are intended to be carried by the conveyor in a particular application, the openings 26 and depending blocks 40 may be omitted as illustrated in Figure 6. However, where heavy loads are intended to be carried by the conveyor and consequent large forces are transmitted between the chain and sprocket, the depending blocks 40 are utilized to transmit the greater portion of the load. The sides 44 of each block 40 are tapered to be readily receivable in the openings 26 of the sprockets as the sprockets rotate.

Each link is also provided on the radially outer side opposite to the block 40 with a mounting block or boss 42, each of the mounting blocks being aligned with a corresponding mounting block of a link in the chain carried by the aligned sprockets at the opposite side of an assembled conveyor.

The conveyor flights are best seen in Figures 1, 4 and 5 and comprise a pair of spaced, preferably rectangular, sleeve portions 48 the outer walls of which define an opening 50 adapted to be received over a mounting block 42 of the conveyor chain and locked thereon by any desired means such as by a set screw 52. Connecting the sleeves 48 are a pair of flight rods 54 adapted to be received in openings 56 formed in the respective sleeves 48. Each flight rod is provided at each end with a peripheral groove 58 as best seen in Figure 5 whereby the rod may be retained in the sleeve by means of a locking screw 60 yet still permitted to be rotated when desired as will be explained hereinafter. The flight rods are provided with a plurality of spaced body mounting pins 62 which may be straight or hook formed as desired. The body mounting pins of one of the pair of flight rods are preferably staggered as related to the body mounting pins of the other of the pair of flight rods.

The body mounting means may be of any desired material depending on what is intended to be carried by the conveyor and preferably in the present embodiment is either a plurality of short mesh screens or a plurality of individual wires. Figure 1 illustrates the conveyor body means as comprising individual wires having each end thereof formed into an eye adapted to be received over one of the body mounting pins 62.

From the above description it is seen that the conveyor is readily convertible as to length and also, by using longer or shorter flights and leaving all other portions of the conveyor unchanged, is readily convertible as to width. Furthermore, if any portion of a conveyor body is damaged, the damaged portion is readily replaced by the simple expedient of loosening the locking screw 60, rotating the flight rod 54 to which the damaged body member is secured, then slipping a new body member over the wires and once again rotating the flight rod 54 to lock the body member in place. It should be noted that in the locked position the pins of related flight rods 54 are pointing in a direction toward each other. However, the conveyor body means are readily releasable when the flight rods are rotated through an angle of at least 90°.

Figure 6 illustrates the manner in which the radially outer blocks of a particular chain may be utilized to drive an associated chain in the opposite direction so that two conveyors may be moved toward each other as might be desirable where two substances are to be mixed and dropped, for example, onto a transverse conveyor. In this instance, the flight rods would be mounted directly into the mounting blocks 42 and the conveyor body means secured thereto in a manner similar to that described in the first-mentioned embodiment.

In certain instances it may be desirable to operate a gear and chain combination with the gear disposed in a horizontal rather than in a vertical plane. In a case such as this retainer plates 66 may be utilized in order to prevent the chain 30 from sliding out of the transverse grooves 26 and 28.

I claim:

1. In a chain gear conveyor, the combination of: a frame, a power drive shaft journaled in the frame, spaced sprockets mounted on said drive shaft for rotation therewith, a driven shaft journaled in the frame and in parallel alignment with said drive shaft, other spaced sprockets mounted on said driven shaft and aligned with said first mentioned sprockets, chain means connecting respective aligned sprockets, said chain comprising a plurality of links, releasable pin means pivotally interconnecting sequential links, mounting means on each of said links on the side thereof radially away from the shafts, each of said mounting means being aligned with a corresponding mounting means on the sprocket spaced therefrom, conveyor flights adapted to be releasably secured to related mounting means, each of said flights comprising a plurality of parallel rods rotatable about their longitudinal axes, means for locking said rods in a selected position, a plurality of pins carried by said rods and extending radially thereof, and conveyor body means releasably securable to the pins of each sequential pair of flights, said body means being releasable when said rods are in one rotative position and held securely in place when said rods are in a second rotative position.

2. Conveyor means comprising a frame, spaced shafts journaled in said frame, spaced sprockets on one of said shafts, spaced sprockets on the other of said shafts in alignment with respective sprockets of said one shaft, chain means connecting the aligned sprockets, conveyor body support means inter-connecting said chains at spaced intervals, each of said means comprising rod support means, a pair of spaced substantially parallel rods rotatably carried in each of said rod support means, a plurality of pin means projecting from said rods radially thereof, conveyor body means comprising wires interconnecting the pin means of a rod of one conveyor body support means to the pin means of a rod of another of said conveyor support means, said body means being releasable for replacement thereof upon rotation of one of said rods in a direction to move the pin means thereof toward the other rod of said pair.

3. A conveying system comprising a pair of flight conveyors each of said conveyors comprising parallel driving and driven shafts, spaced sprockets keyed on each of said shafts, endless chains connecting respective sprockets, each of said sprockets having spaced transverse arcuate recesses around the periphery thereof and rectilinear transverse recesses between each sequential pair of arcuate recesses, said chains comprising individual links, means for pivotally connecting adjacent links, arcuate portions on said links at each connection point, said arcuate portions being drivingly receivable in said arcuate recesses as said sprockets rotate, opposed bosses on each of said links at the radially inner and radially outer surfaces thereof, the radially inner bosses being drivingly receivable in said rectilinear recesses of the sprockets, the radially outer bosses of a sprocket of one of said conveyors being adapted to be received between the radially outer bosses of a sprocket of the other conveyor for driving the latter when motion is imparted to the sprockets of said one conveyor.

4. A conveying system comprising a pair of flight conveyors each comprising parallel driving and driven shafts, spaced sprockets keyed on each of said shafts, endless chains connecting respective sprockets, said chains comprising individual links, means for pivotally connecting adjacent links, bosses on each of said links at the radially outer surfaces thereof, the bosses of a sprocket of one conveyor being adapted to be received between the bosses of a sprocket of the second conveyor for driving the latter when motion is imparted to the sprockets of said one conveyor.

5. A flight conveyor comprising: spaced endless chains, each of said chains formed of detachable links; pin means releasably and pivotally joining sequential links; a plurality of rods interconnecting said chains at spaced intervals therealong, said rods being readily releasable from said chains; a plurality of pin means projecting from each of said rods; and conveyor surface means comprising wires interconnecting sequential rods, said surface means having openings along the edges thereof adjacent respective rods; said rods being rotatable to a first position where said pins are receivable through related openings, said rods being rotatable to a second position for preventing release of said surface means.

6. A flight conveyor comprising spaced endless chains; a plurality of rotatable rods interconnecting said chains at spaced intervals therealong; a plurality of pin means projecting from each of said rods, the pin means of sequential pairs of rods being movable toward each other when said rods are rotated to a first position and movable away from each other when said rods are rotated to a second position; and conveyor body means comprising wires receivable over said pins when said rods are in said first position, said wires being locked in place when said rods are in said second position.

7. A flight conveyor comprising: spaced endless chains; a plurality of rotatable rods interconnecting said chains at spaced intervals therealong; a plurality of pin means projecting from each of said rods; conveying surface means comprising wires received over said pin means and interconnecting sequential rods; and means for releasably locking said rods in selected rotatable positions.

8. A portable conveyor comprising: spaced endless chains; a plurality of flight means spaced from each other longitudinally of said chains; means for releasably mounting said flight means on said chains; each of said flight means comprising a pair of rods having opposite ends rotatably and releasably received in respective mounting means; substantially co-planar pin means carred by said rods and projecting substantially radially therefrom; and a plurality of readily releasable conveyor surface means comprising wires carried by the pins of the rods of sequential flights.

9. A portable conveyor comprising: spaced endless chains; a plurality of flight means spaced from each other longitudinally of said chains; means for releasably mounting said flight means on said chains; each of said flight means comprising a pair of rods having opposite ends rotatably and releasably received in respective mounting means; substantially co-planar pin means carried by said rods and projecting substantially radially therefrom; and a plurality of readily releasable conveyor surface means comprising wires carried by the pins of the rods of sequential flights, each of said surface means being releasable by rotation of one rod of a pair in a direction to move the pins thereof away from the other rod of said pair.

10. A flight conveyor comprising: spaced endless chains; a plurality of rods interconnecting said chains at spaced intervals therealong, a plurality of pin means projecting from each of said rods; and conveyor surface means comprising wires having openings adjacent respective rods; said rods being rotatable to a first position wherein said pins are receivable through related openings, said rods being rotatable to a second position for preventing release of said surface means.

References Cited in the file of this patent

UNITED STATES PATENTS

| | | |
|---|---|---|
| 1,456,715 | Reck | May 29, 1923 |
| 1,555,867 | Marshall | Oct. 6, 1925 |
| 1,758,397 | Harber | May 13, 1930 |
| 2,303,587 | Snyder | Dec. 1, 1942 |